Dec. 3, 1929.                A. BENSON                1,737,990
                             CUTTING TOOL
                Filed Jan. 18, 1926        3 Sheets-Sheet 1

Inventor:
Andrew Benson,
By Glenn S. Noble
Atty.

Dec. 3, 1929.    A. BENSON    1,737,990
CUTTING TOOL
Filed Jan. 18, 1926    3 Sheets-Sheet 2

Inventor:
Andrew Benson,
By Glenn S. Noble
Atty.

Dec. 3, 1929.  A. BENSON  1,737,990
CUTTING TOOL
Filed Jan. 18, 1926   3 Sheets-Sheet 3
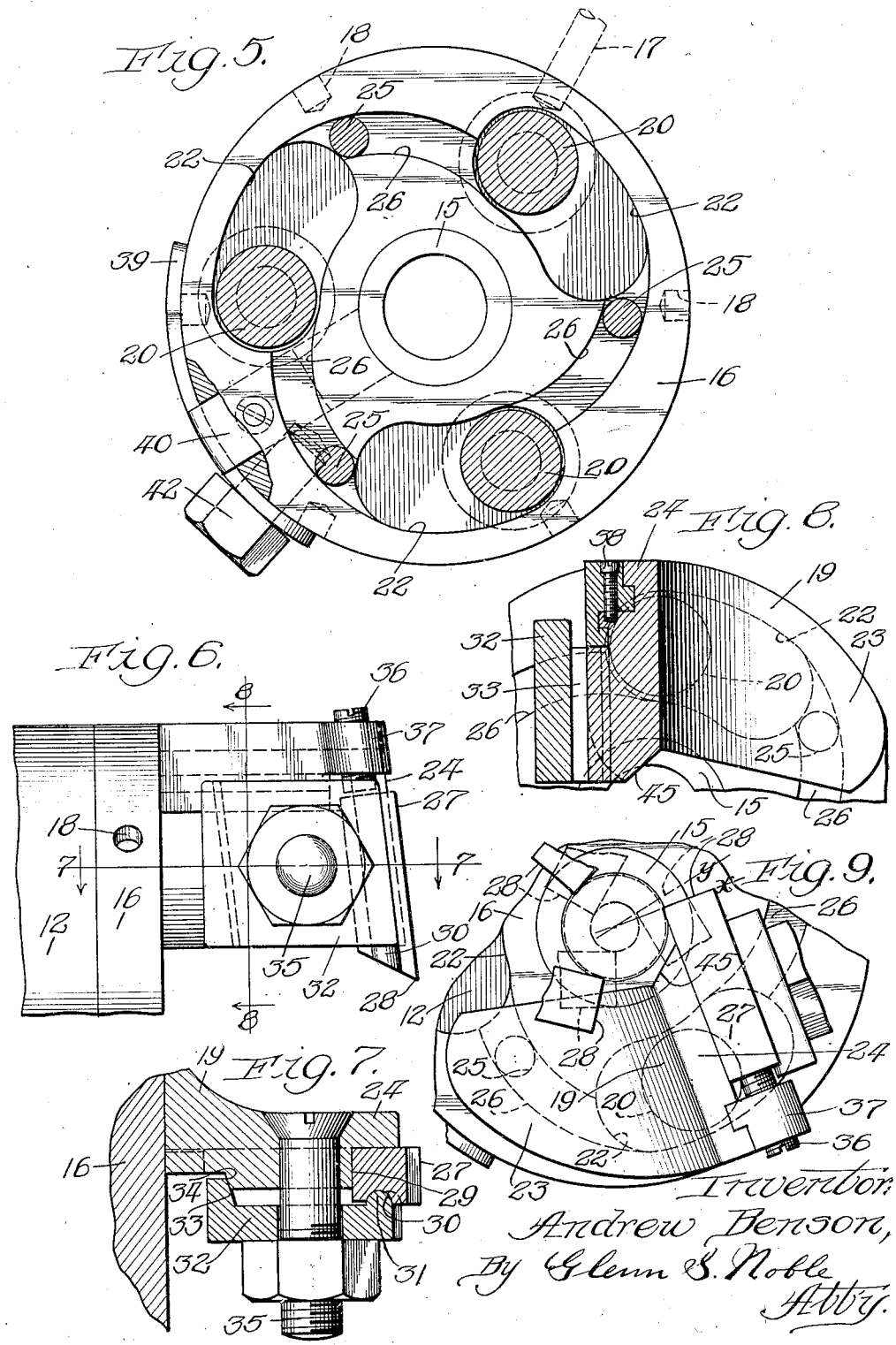

Patented Dec. 3, 1929

1,737,990

UNITED STATES PATENT OFFICE

ANDREW BENSON, OF CHICAGO, ILLINOIS

CUTTING TOOL

Application filed January 18, 1926. Serial No. 82,027.

This invention relates more particularly to cutting tools of box type, such tools being adapted for use in connection with machines of the screw machine type, lathe type, or the like. Box cutting tools, as heretofore constructed, have universally been provided with only one cutting tool or bit. Obviously with such a tool, the cutting operation is confined to one side only of the work piece, which, if not otherwise counter-acted, tends to bend or deform the work piece as the cutting operation takes place. This has necessitated the employment of special backing devices for the work piece in order to prevent bending or distorting of the work piece. Furthermore, with the prior types of devices, any change in the finished diameter of the work piece being operated upon, necessitates not only an adjustment of the cutting tool, but a corresponding change or adjustment of the backing support for the work piece associated therewith.

In accordance with my present invention, I provide a box cutting tool having a plurality of cutting tools proper or bits which are uniformly arranged around the circumference of the work piece so that the thrust from one cutting tool will be counter-acted by the thrust from the other cutting tools, thereby eliminating the necessity of separate backing supports for the work piece. Further, I so arrange my improvements that the cutting tools proper or bits may be easily and quickly adjusted to produce different diameter products, all such adjustments being made on the box cutter at much greater speed than an adjustment can be made for different diameters with the older types of cutting devices.

The objects of this invention are to provide an improved box tool which may be conveniently manufactured and which will be particularly efficient and durable in operation; to provide a box tool having a plurality of circumferentially arranged bits or cutting members; to provide a tool of this character having a plurality of adjustable holders and means for adjusting the cutting tools in the holders; to provide a tool of this character having a plurality of pivoted holders and means for simultaneously swinging the holders on their pivots and holding them in adjusted position; to provide novel means for holding the bits or cutting tools; and to provide such other features and improvements as will appear more fully from the following specification.

In the accompanying drawings illustrating this invention:

Figure 5 is a sectional view taken on the line 5—5 of Figure 1;

Figure 6 is a detail showing a side view of one of the holders;

Figure 7 is a sectional view taken on the line 7—7 of Figure 6;

Figure 8 is a sectional view taken on the line 8—8 of Figure 6; and

Figure 9 is a fragmentary front view showing different positions of the cutting tools.

Figure 1:
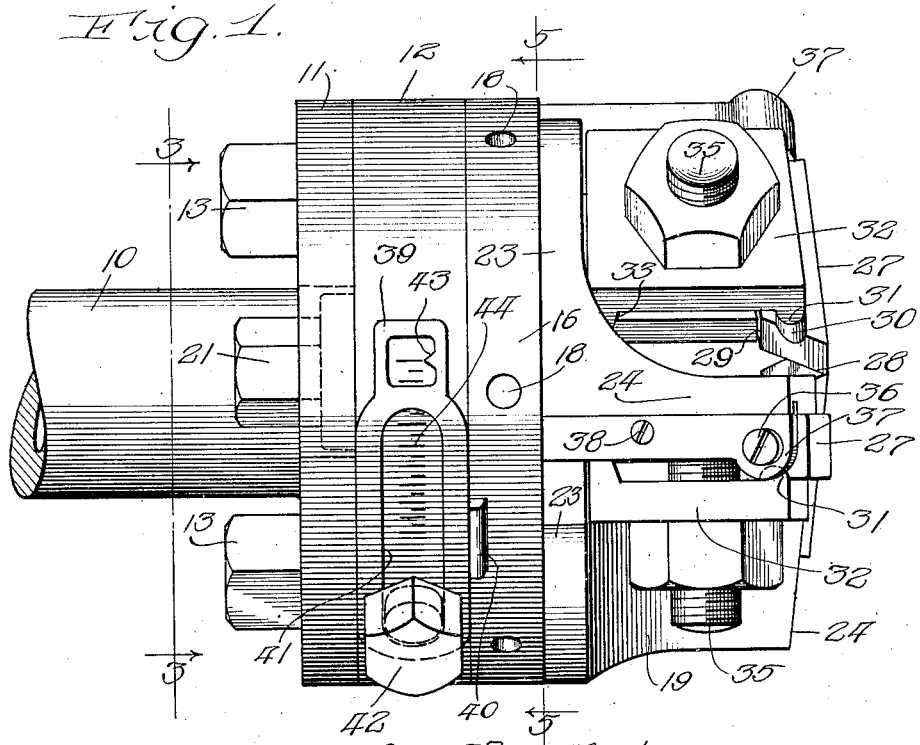
Figure 1 is a side view showing a preferred form of my invention;

The spindle 10, as shown in these drawings, is made hollow in order to permit the work piece to pass into or through the same and is provided with a flange 11 at one end thereof. A disk or headblock 12 is secured to the flange 11 by means of cap screws 13 which pass through holes 14 in the flange, which are of larger diameter than the screws in order to permit adjustment of the headblock with respect to the flange. The headblock has a central hub or projection 15 on which is mounted a ring 16 which may be adjusted as by means of a spanner or pin 17, which may be inserted in the holes 18 in the ring for rotating the same.

Figure 4:
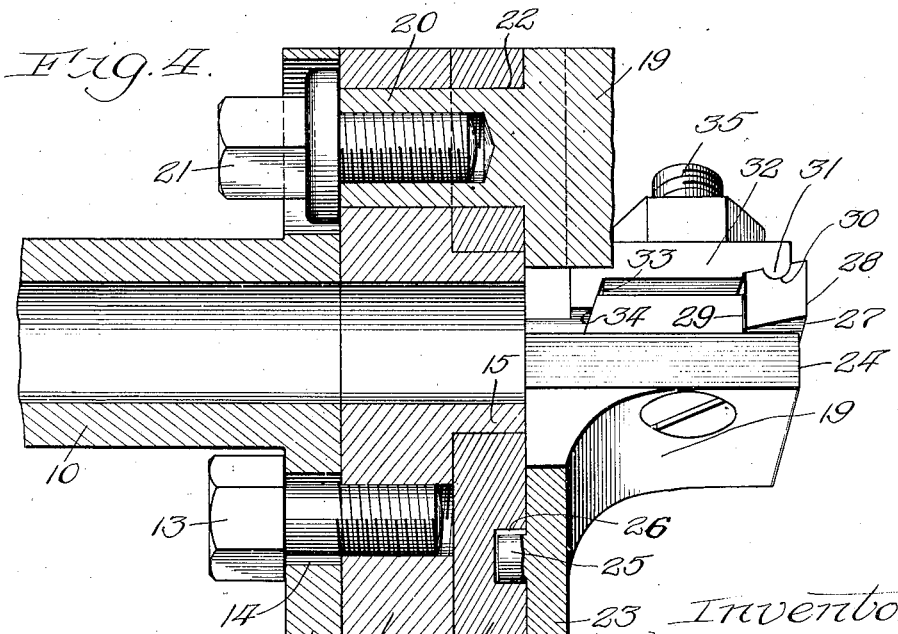
Figure 4 is a sectional view taken on the line 4—4 of Figure 2;

The bit or cutting tool holders 19 are provided with trunnions or pivots 20 which engage with the headblock 12 and are provided with cap screws 21 for holding them in position, as shown particularly in Figure 4. These holders preferably extend over the end of the projection 15 so that they do not bind on the ring 16. The ring 16 has circumferential slots 22 for the trunnions 20, so that it may be rotated with respect to the headblock, as will be seen from Figure 5. Each tool holder 19 is of somewhat angular cross section and comprises a base portion 23 which projects over the ring 16 and an outwardly extending portion or arm 24 which stands out at substantially right angles to the face of the ring. Each base portion is provided with a projection or pin 25 which engages with a corresponding cam groove or slot 26 in the ring 16, the arrangement being such that when the ring is rotated on the hub 15, the pins or projections 25 will move toward or away from the center and thereby swing the tool holders on their pivots.

While any suitable cutting tools or bits may be used, I prefer to use tools 27, which are rectangular in cross section and sharpened at one end 28, as shown particularly in Figures 6 and 7. The arms or branches 24 of the tool holders are provided with angular seats or recesses 29 for receiving the cutting tools, which are drawn against the seats by novel holding devices. The outer sides of the cutting tools are provided with grooves 30 for receiving projections 31 on the sides of the holding plates 32. The opposite ends of these plates have bevelled faces 33 for engagement with bevelled shoulders 34 on the face of the tool holder as shown in Figure 7. Bolts 35 are provided for drawing the holding plates or clamps 32 against the holders and bits, the arrangement being such that when the bolts are tightened, the bevelled portions of the plate will be drawn inwardly so as to draw the bits or cutting tools against their seats.

The cutting tools are adjusted longitudinally and held in such adjusted position by means of screws 36, which engage with the outer portions of the holders. For convenience in construction, such outer portions comprise strips 37 which are tongued and grooved to engage with the correspondingly tongued and grooved portions of the holders, as shown in Figure 8 and are held in position by screws 38.

Figure 2:
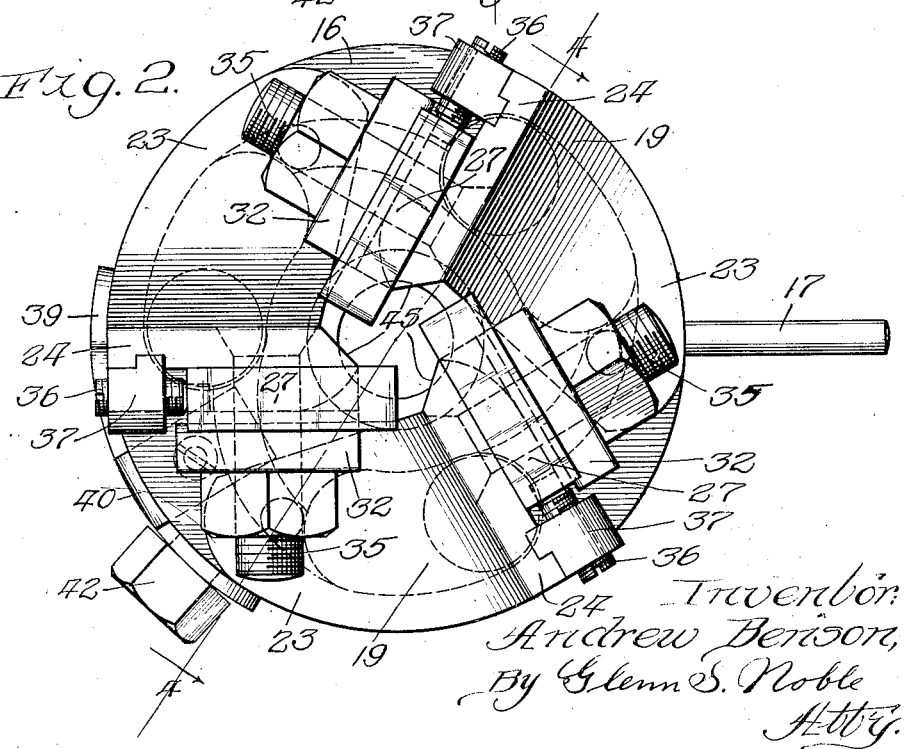
Figure 2 is a front view.
Figure 3:
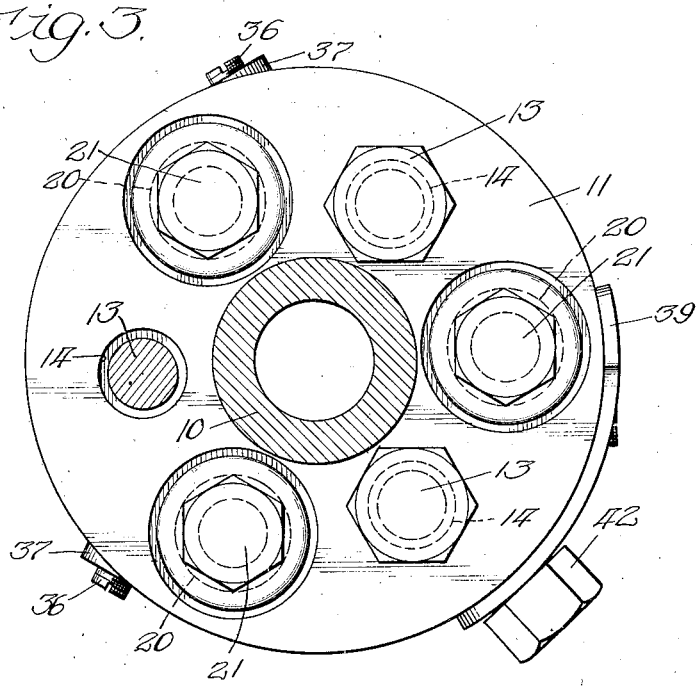
Figure 3 is a sectional view taken on the line 3—3 of Figure 1.

The ring 16 is held in adjusted position by means of a segment 39 which is provided with a tongue 40 which is secured to the ring 16, as shown in Figures 1, 2 and 5. This segment has a slot 41 for receiving a set screw 42 which engages with the headblock 12 and is adapted to fasten the segment in adjusted position. The segment is also provided with a pointer 43 which coacts with a scale 44 on the headblock to indicate the angular adjustment of the ring, and consequently the position of the cutting tools.

The longitudinal adjustment of the cutting tools will be readily seen from Figure 9. When the box tool has been secured in the machine and the work piece centered, the respective cutting tools 27 are adjusted toward or away from the work piece so that they will all cut equally, and when so adjusted may be held securely in position by the clamps 32 and adjusting screws 36. Having the tools all adjusted to cut at equal distances from the center, they will of course coact to cut a true cylindrical surface, and any lateral pressure exerted on the work piece by one tool will be counteracted by the pressure of the other tools. When it is desired to move all of the cutting tools toward or away from the center, the operator releases the ring 16 and rotates it on the hub 15. The cams 26 acting on the pins 25 will cause them to move toward or away from the center and thereby swing the tool holders on the pivots 20. This causes the inner ends of the tools to move toward or away from the center. One of the particularly important features of this invention relates to this movement of the inner ends of the tools. Assuming that the inner ends of the tools are at substantially right angles to the sides, such inner end will be on a radius from the center, as indicated by the line X in Figure 9, when the tool is, for instance, in its extreme outward position or in position to cut on the largest diameter for which the device is adapted. The pivot points are preferably arranged so that when the inner ends of the tools are swung inwardly they will at all times be substantially radial, even to the extreme inner position as indicated by the line Y. On account of selecting the centers of rotation of the tool holders in this manner, the cutting edges of the tools will always be presented to the work piece in the most advantageous manner. The tool holders may of course be provided with seats for holding the tools at any desired angle with respect to the plane of cutting, and as shown in Figure 6, I prefer to allow a slight pitch to the tools to facilitate the cutting operation. In a box cutting tool of the type hereinbefore described, an essential feature is the provision of ample clearances for the chips cut from the work piece, and to this end, not only have I arranged the tool holders, as clearly shown in the drawings, with a relatively large space between the operative end of each tool holder and the opposite, next adjacent tool holder, but have also cut away or beveled the tool holders proper as shown at 45 best in Figures 2 and 8. With these ample clearances, the chips or metal shavings have a free outlet and danger of clogging the box cutter is obviated.

From this description, it will be readily apparent to those familiar with this art, that my improved tool may be utilized for turning or finishing various articles and is particularly advantageous for working on shafts or the like having portions of different diameters, as the tool may be readily adjusted to cut the different diameters as the work progresses. Furthermore, where a number of articles are to be turned or finished, the tool may be opened for removing the article and may again be quickly adjusted to cutting position for the next article. In some instances, where a machine in which the tool is to be used is not absolutely true or accurately centered, the screws 13 may be loosened and the head adjusted on the spindle 10 so that the box tool will be centered with respect to the work piece and then the screws 13 may be tightened to hold the head in adjusted position.

From the preceding description considered in connection with the drawings, it will further be observed that the inner cutting end edges of the cutting tools proper are projected to the most advanced point of the entire device, that is, are at the most extreme point axially of the box cutter so as to engage the work piece as relative longitudinal movement between the work piece and the box cutter takes place. In order to accomplish this, each cutting tool proper is mounted on the forward or most advanced end of its respective holder and the cutting tools proper inclined from their outer to their inner ends in a direction forwardly toward the advancing work piece. As will be clear from an inspection of the drawings, the cutters proper are so arranged that they remove the surplus material from the work piece by helical chips or shavings and in such manner that an annular shoulder is formed at the advanced end of the finished diameter section of the work piece, the surface of said annular shoulder being in a plane which is normal or perpendicular to the axis of the work piece.

It will be evident that various changes may be made in the arrangement of the parts and details of construction to adapt my improved box tool for different purposes or for use on different work pieces, and therefore I do not wish to be limited to the exact construction herein shown and described, except as specified in the following claims, in which I claim:

1. In a tool of the box type, the combination of a head, a plurality of tool holders pivotally mounted on the head and disposed radially around the axis of the work, tools mounted on the forward ends of said holders and adapted to swing toward and away from and the axis of the head, the cutting edge of each of said tools extending in a plane approximately perpendicular to the longitudinal axis of the work, pins on said holders arranged at some distance from the pivots, a cam ring rotatably mounted on the head and having cam slots for receiving said pins, means for turning the ring whereby the pins will move toward and away from the center to swing the tool holders, and means for holding the ring in adjusted position.

2. In a box tool, the combination of a plurality of cutting tools, tool holders for said tools, means for supporting said tool holders, said holders being pivoted on the supporting means whereby the inner cutting end edges of all of the tools will extend on substantially radial lines from the axis of the box tool throughout their range of adjustment as the holders are swung on their pivots, the long axis of each of said tools being substantially at right angles to its cutting edge, and means for simultaneously swinging the holders to any desired adjusted position.

3. In a box tool, the combination with a main support; of a plurality of tool holders adjustably mounted on said support at the forward end thereof, said holders being symmetrically and substantially radially arranged with respect to the axis of the support, each holder having a tool receiving seat at its forward end and extending substantially radially of said axis, and means for clamping a cutting tool on each holder with the cutting edge extending in a plane approximately perpendicular to said axis.

4. In a box tool, the combination with a main support; of a plurality of tool holders adjustably mounted on said support at the forward end thereof, said holders being arranged in a series around the forward end of said support, each holder having a tool receiving seat at its forward end and extending substantially radially of the axis of the work, said seat extending lengthwise of the holder and being inclined forwardly from its outer to its inner end, whereby when the tool is in place, the inner active edge of the latter is the most axially advanced part thereof presented to the work piece; and means for clamping a tool on each holder.

5. In a box tool, the combination with a main support; of a plurality of tool holders secured in position on said support at the forward end thereof, said holders being circumferentially equally spaced, each holder having a tool receiving seat at its forward end, said seat extending in a direction approximately radial to the work piece; and means associated with each tool holder for clamping a tool thereon with its cutting edge extending in a line substantially radial to the axis of the work piece and approximately at right angles to said direction of the tool seat.

6. In a box tool, the combination with a main support; of a tool holder adjustably mounted on said support, said holder having a tool receiving seat extending substantially radially of the axis of said support, said axis being coincident with the long axis of the work piece, and means for clamping a cutting tool on said holder with the cutting edge extending in a plane approximately perpendicular to said axis.

7. In a box tool, the combination of a main support, a plurality of cutting tools arranged symmetrically on said support and substantially radially about the central axis of said support, each of said tools having a cutting edge extending in a plane approximately perpendicular to said axis, for simultaneously engaging a piece of work having its longitudinal axis coincident with said central axis of the work support.

8. In a cutting tool of the character described, the combination with a support having an axial opening therethrough; of a plurality of tool holders mounted on said support at the forward end thereof, said holders being arranged in a series around said axial opening and each holder being cut away from its outer free end back toward the support to provide clearance for portions removed from the work piece, each said holder having a tool-receiving seat at its forward end and extending substantially radially of the axis of said opening, said seat extending lengthwise of the holder and being inclined forwardly from its outer to its inner end whereby when the tool is in place, the inner active edge of the latter has the most axially advanced part thereof presented to the work piece; and means for clamping a tool on each holder.

ANDREW BENSON.